(12) United States Patent
Foote

(10) Patent No.: US 9,058,414 B2
(45) Date of Patent: Jun. 16, 2015

(54) REMOTELY CONTROLLED DATA LOGGING

(71) Applicant: THOMSON LICENSING, Issy de Moulineaux (FR)

(72) Inventor: Evan Michael Foote, Carmel, IN (US)

(73) Assignee: THOMSON LICENSING, Issy les Moulineaux (FR)

( * ) Notice: Subject to any disclaimer, the term of this patent is extended or adjusted under 35 U.S.C. 154(b) by 212 days.

(21) Appl. No.: 13/681,926

(22) Filed: Nov. 20, 2012

(65) Prior Publication Data

US 2014/0143609 A1    May 22, 2014

(51) Int. Cl.
*G06F 11/34* (2006.01)
*H04L 12/26* (2006.01)
*H04L 29/08* (2006.01)
*H04L 29/06* (2006.01)

(52) U.S. Cl.
CPC ........ *G06F 11/3409* (2013.01); *G06F 11/3495* (2013.01); *G06F 11/3476* (2013.01); *H04L 43/0888* (2013.01); *H04L 43/50* (2013.01); *H04L 67/08* (2013.01); *H04L 69/16* (2013.01); *H04L 69/04* (2013.01)

(58) Field of Classification Search
CPC ............ G06F 11/3409; G06F 11/3082; G06F 11/3476; G06F 11/3072; G06F 11/3079; G06F 11/30; G06F 2201/86; H04M 2250/60
See application file for complete search history.

(56) References Cited

U.S. PATENT DOCUMENTS

| | | | |
|---|---|---|---|
| 6,178,427 B1 * | 1/2001 | Parker | 1/1 |
| 2006/0264241 A1 * | 11/2006 | Koyamatsu et al. | 455/561 |
| 2008/0294384 A1 * | 11/2008 | Fok et al. | 702/187 |
| 2009/0113244 A1 * | 4/2009 | Doshi et al. | 714/25 |

* cited by examiner

*Primary Examiner* — Nadeem Iqbal
(74) *Attorney, Agent, or Firm* — Robert D. Shedd; Jeffrey M. Navon; Catherine A. Cooper

(57) ABSTRACT

A method and system to remotely control data logging are described including establishing a first connection, transmitting a signal to initiate data logging, terminating the established first connection, initializing a timer, determining if the timer has expired, establishing a second connection, transmitting a signal to cease data logging, transmitting a signal to collect the logged data and receiving the logged data.

4 Claims, 4 Drawing Sheets

REMOTELY CONTROLLED DATA LOGGING

FIELD OF THE INVENTION

The present invention relates to data logging and in particular, to remote controlled data logging.

BACKGROUND OF THE INVENTION

Conventional data logging systems are not remotely controlled. The issue addressed by the present invention arose in the course of performance testing, which is used to explain the present invention but the present invention is not limited to testing systems.

In the field of testing there are several types of testing. At the system level the system or device to be tested is viewed as a black box and testing performed to determine if a proper input results in an expected and proper output. At the functional level, the contents of the black box are known and testing is performed to determine if for each and every possible input (including error conditions both expected and unexpected) produces an expected and proper output. Finally there is performance testing. Performance testing is performed last and is designed to determine how big, how fast, how much type results. For example, user interface testing may include both functional testing and performance testing. If a user enters an input, then functionally is the output proper and expected (including error conditions). In terms of performance, is the output provided within the expected time or is the user sitting there waiting for minutes or hours for a response. It is in this context that the present invention is set.

In testing TCP throughput versus distance, two wireless boards were used. The test software used could determine the rate at which data was sent between a Test PC and a Host PC, but little else was known about the network while the tests were running. Of particular interest was the received signal strength indication (RSSI) and modulation channel selection (MCS) of the connection between the wireless boards, which is only available via serial cable or telnet. The best way to access data was via telnet. A problem arose; for the Test PC to access the AP wireless board, it had to connect over the wireless connection. This would add overhead during the throughput tests and give an inaccurate throughput measurement.

It would be advantageous to have a means to remotely control data logging.

SUMMARY OF THE INVENTION

The present invention seeks to solve a performance testing problem in the testing of throughput and data rates, where accurate measurements are critical.

A method and system to remotely control data logging are described including establishing a first connection, transmitting a signal to initiate data logging, terminating the established first connection, initializing a timer, determining if the timer has expired, establishing a second connection, transmitting a signal to cease data logging, transmitting a signal to collect the logged data and receiving the logged data.

BRIEF DESCRIPTION OF THE DRAWINGS

The present invention is best understood from the following detailed description when read in conjunction with the accompanying drawings. The drawings include the following figures briefly described below.

DETAILED DESCRIPTION OF THE PREFERRED EMBODIMENTS

The present invention is directed to remotely controlled data logging and is explained using a testing system.

In the field of testing there are several types of testing. At the system level the system or device to be tested is viewed as a black box and testing performed to determine if a proper input results in an expected and proper output. At the functional level, the contents of the black box are known and testing is performed to determine if for each and every possible input (including error conditions both expected and unexpected) produces an expected and proper output. Finally there is performance testing. Performance testing is performed last and is designed to determine how big, how fast, how much type results. For example, user interface testing may include both functional testing and performance testing. If a user enters an input, then functionally is the output proper and expected (including error conditions). In terms of performance, is the output provided within the expected time or is the user sitting there waiting for minutes or hours for a response. It is in this context that the present invention is set.

In testing TCP throughput versus distance, two wireless boards were used. The test software used could determine the rate at which data was sent between a Test PC and a Host PC, but little else was known about the network while the tests were running. Of particular interest was the received signal strength indication (RSSI) and modulation channel selection (MCS) of the connection between the wireless boards, which is only available via serial cable or telnet. The best way to access data was via telnet. A problem arose; for the Test PC to access the AP wireless board, it had to connect over the wireless connection. This would add overhead during the throughput tests and give an inaccurate throughput measurement.

Figure 1:
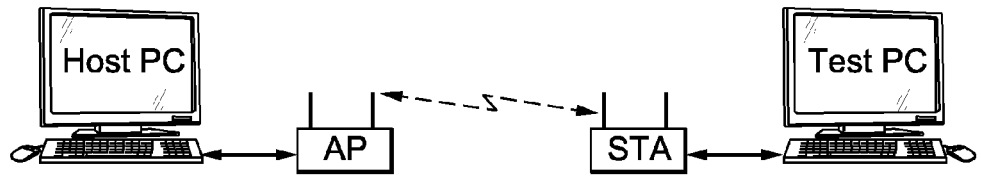
FIG. 1 is a block diagram of the test system.

FIG. 1 is a block diagram of the test system. The connection between the AP and the station (STA) is wireless, costly and the connection which is to be tested. It should be noted that the STA can be a set top box (STB), a desktop, laptop, mobile device of any sort including, for example, a dual mode smart phone, a personal digital assistant (PDA), an iPod, an iPhone, an iPad, a tablet or any equivalent device used for communicating wirelessly. The connection between the AP and the STA may be a bottleneck. The connection between the Host PC and the AP as well as the connection between the Test PC and the STA are wired line gigabit Ethernet connection which are significantly faster that the wireless connection.

Figure 2:
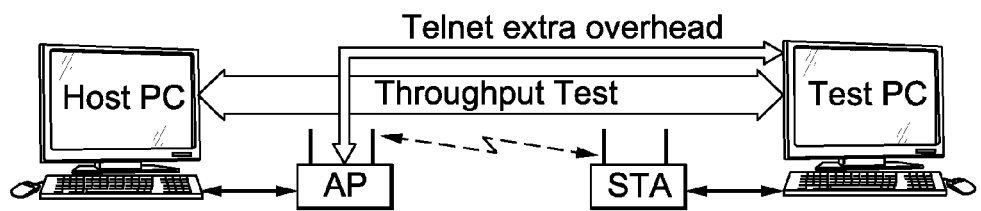
FIG. 2 is a block diagram of the problem with performance testing.

FIG. 2 is block diagram of the problem with performance testing. A telnet connection directly to the AP via Test PC to STA results in extra overhead between the AP and STA wireless connection, thus making the throughput test inaccurate. The throughput test is between the AP and the STA. The heavy live denoted as throughput testing is part of the problem solution, which was to write an application that would connect the Test PC to the Host PC, initiate telnet logging from the Host PC to the access point (AP), and disconnect the Test PC from the Host PC. Then, the throughput tests could commence without overhead in the critical portion of the network. After the throughput test completed, the application on the Test PC would then reconnect with the Host PC, stop the telnet logging, and transfer the data logs.

Figure 3:
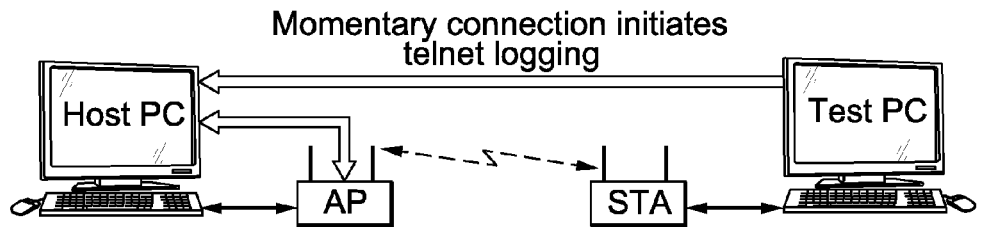
FIG. 3 is a block diagram of an exemplary solution in which a momentary connection is made between the Test PC and the Host PC in accordance with the principle of the present invention.

FIG. 3 is a block diagram of an exemplary solution in accordance with the principles of the present invention. An exemplary solution is to start the Host PC to log telnet data from the AP. This telnet connection goes over a gigabit Ethernet connection instead of the bottlenecked "costly" Wifi connection from the AP to the STA.

Figure 4:
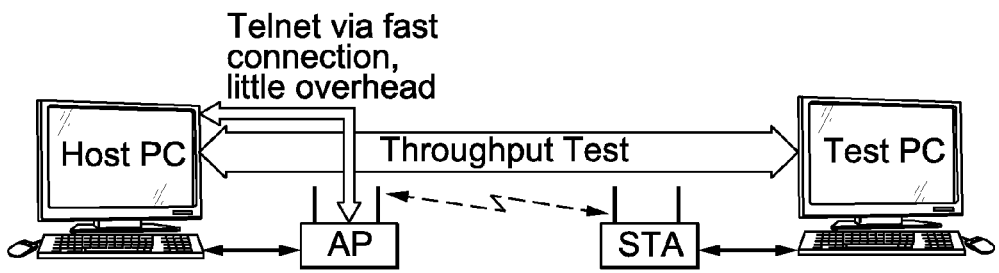
FIG. 4 is a block diagram of an exemplary solution in which a connection is made between the Host PC and the AP in order to start telenet data logging in accordance with the principle of the present invention.

FIG. 4 is a block diagram of an exemplary solution in which a momentary connection is made between the Host PC and the AP in order to start telenet data logging in accordance with the principle of the present invention. The Test PC disconnects from the Host PC, and the throughput test is started by the Host PC. A true measurement of the AP-STA bottleneck can be made. During the test, the Host PC continues to take data from the AP about the Wifi connection. The AP in the test does not have sufficient memory to log the test results so the test results are logged by the Host PC.

Figure 5:
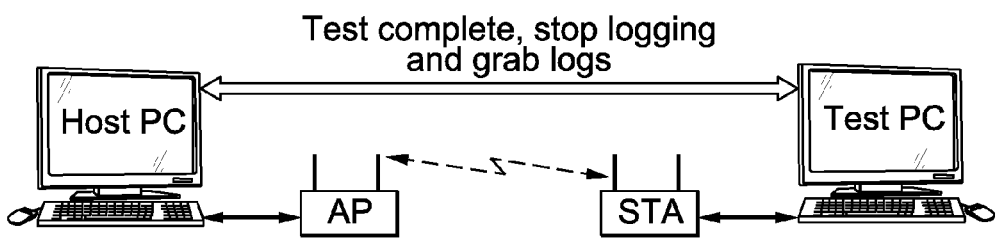
FIG. 5 is a block diagram of an exemplary solution in which a connection is made between the Host PC and the Test PC in order to stop the throughput test, stop data logging and collect the logged data in accordance with the principle of the present invention.

FIG. 5 is a block diagram of an exemplary solution in which a connection is made between the Host PC and the Test PC in order to stop the throughput test, stop data logging and collect the logged data in accordance with the principle of the present invention. Since a throughput test is typically a timed test, once the time for the throughput test is reached, the Test PC re-establishes a connection with the Host PC to stop the test, stop logging telnet data from AP and to transmit all logged data from the test back to the Test PC.

Figure 6:
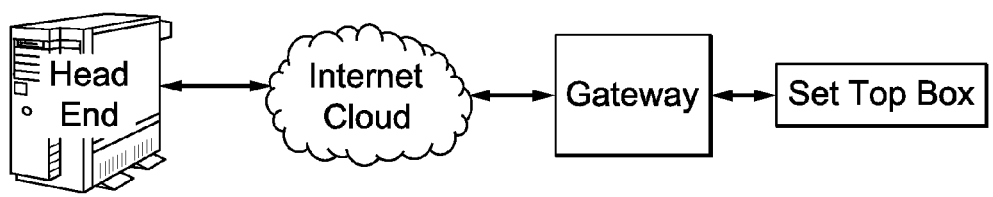
FIG. 6 is a related system where a similar issue occurs.

FIG. 6 is a related system where a similar issue occurs. The Head End needs to log data from the Gateway, but keeping an open connection through the internet cloud is costly. Instead, the Head End will instruct the STB to begin taking log data from Gateway. After the log is complete, the Head End will instruct the STB to send data back all at once to the Head End via the internet cloud. The characteristics of systems that this method is advantageous:

Connection between the Head End and the Gateway is more expensive than the connection between Gateway and Set top box.

The Gateway does not have enough memory or the ability to store real time information about itself Information (data) logged does not take much space, but must be logged over a very long period of time, OR Information logged takes a great deal of space, but must be logged during a very short period of time. There is not enough bandwidth to connect and transmit in real time.

Data logged does not need to be sent in real time, and is not time critical

Data logged can be highly compressed, but the Gateway does not have processing capabilities.

The Head End needs to get information about ALL Gateways at a single instant of time, but cannot connect to ALL Gateways at once.

In the above scenario, the Head End is actually in the position of the Test PC and initiates data logging.

In both scenarios, the solution may be implemented in software, hardware of firmware or a combination thereof. The signals to start, log data, stop and transmit logged data are well defined and can be implemented in an application specific integrated circuit (ASIC), a reduced instruction set computer (RISC) or a field programmable gate array (FPGA), for example.

Figure 7:
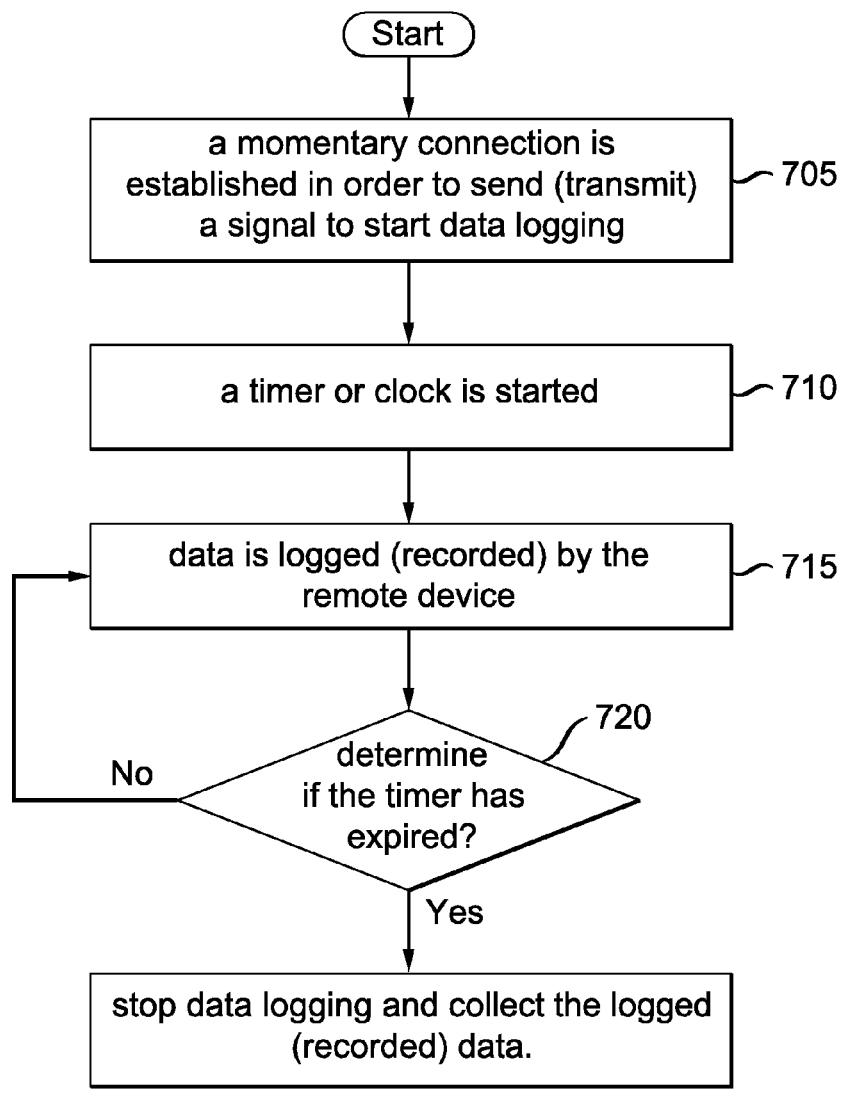
FIG. 7 is a flowchart of an exemplary solution of the problems posed herein in accordance with the principles of the present invention.

FIG. 7 is a flowchart of an exemplary solution of the problems posed herein in accordance with the principles of the present invention. At 705 a momentary connection is established in order to send (transmit) a signal to start data logging. At 710 a timer or clock is started. In a preferred embodiment this is a countdown timer. At 715 data is logged (recorded) by the remote device. At 720 a test is performed to determine if the timer has expired (if a countdown timer is used then the test is to determine if the timer is zero). If the timer has not expired then processing continues at 715. If the timer has expired then a signal is sent (transmitted) to stop data logging and collect the logged (recorded) data. This may be a single signal or two separate signals—one to stop data logging (recording) and a second signal to collect the logged (recorded) data.

Figure 8:
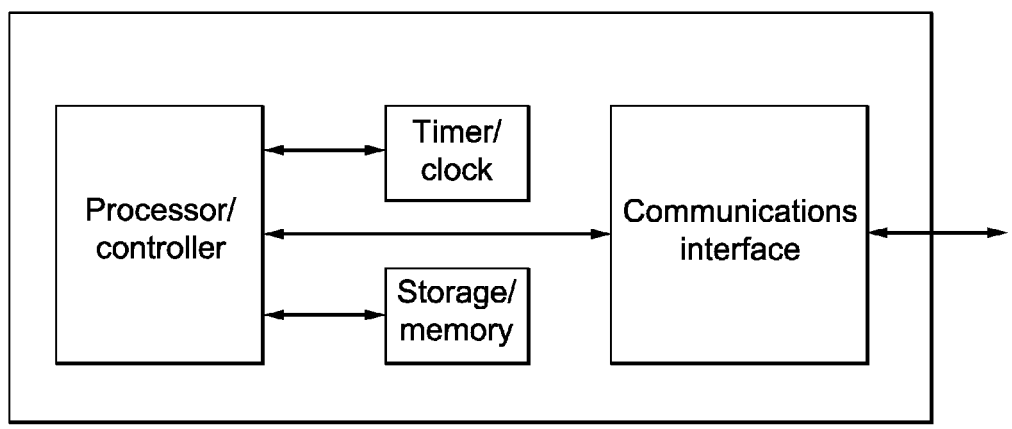
FIG. 8 is a block diagram of an exemplary device to control remote data logging in accordance with the principles of the present invention.

FIG. 8 is a block diagram of an exemplary device to control remote data logging in accordance with the principles of the present invention. A communications interface establishes connections and transmits signals and receives the remotely logged data. A processor or controller controls the functions of the communications interface, the clock/timer and the storage/memory. Storage/memory can include RAM, hard drive, or any form of fixed or removable storage. The communications interface (under the control of the processor) includes the means for establishing a first connection, the means for transmitting a signal to initiate data logging, the means for terminating the established first connection, the means for establishing a second connection, the means for transmitting a signal to cease data logging, the means for transmitting a signal to collect the logged data and the means for receiving the logged data. The processor controls the timer including the means for initializing the timer and the means for determining if the timer has expired. Additionally upon receipt of the logged data the processor stores the received logged data in the memory/storage. Upon receipt of the logged data the processor may process the data further or forward the logged data to another system/device/apparatus to process the logged data. If a separate device is used to process the logged data it may be a special purpose processor depending on what data processing is required of the particular application.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method to remotely control data logging, said method comprising at a head end:
   establishing a first connection with a host;
   transmitting a signal via the first connection to initiate data logging by the host from an access point;
   terminating said established first connection;
   initializing a timer, said timer indicating a time during which data is logged;
   determining if said timer has expired;
   establishing a second connection with the host in response to determining the timer has expired;
   transmitting a signal to cease data logging via said second connection;
   transmitting a signal to collect said logged data via said second connection; and
   receiving said logged data from the host.

2. The method according to claim 1, further comprising logging data by a remote device.

3. A system to remotely control data logging, comprising:
   a communications interface, said communications interface establishing a first connection, said communications interface under control of a processor;
   said communications interface transmitting a signal to initiate data logging;
   said communications interface terminating said established first connection;
   said processor initializing a timer;
   said processor determining if said timer has expired;
   said communications interface establishing a second connection upon expiration of said timer;
   said communications interface transmitting a signal to cease data logging;
   said communications interface transmitting a signal to collect said logged data; and
   said communications interface receiving said logged data.

4. The system according to claim 3, further comprising a remote device, said remote device logging data.

* * * * *